(12) United States Patent
Cao

(10) Patent No.: US 11,625,911 B2
(45) Date of Patent: Apr. 11, 2023

(54) IMAGE RECOGNITION NEURAL NETWORK PROCESSING METHOD, DEVICE AND SYSTEM

(71) Applicant: Shenzhen Intellifusion Technologies Co., Ltd., Guangdong (CN)

(72) Inventor: Qingxin Cao, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,897

(22) PCT Filed: Oct. 27, 2020

(86) PCT No.: PCT/CN2020/124089
§ 371 (c)(1),
(2) Date: Dec. 30, 2021

(87) PCT Pub. No.: WO2021/135573
PCT Pub. Date: Jul. 8, 2021

(65) Prior Publication Data
US 2022/0319161 A1 Oct. 6, 2022

(30) Foreign Application Priority Data
Dec. 31, 2019 (CN) .......................... 201911425797.9

(51) Int. Cl.
*G06V 10/82* (2022.01)
*G06V 10/764* (2022.01)
*G06F 8/41* (2018.01)

(52) U.S. Cl.
CPC ................ *G06V 10/82* (2022.01); *G06F 8/41* (2013.01); *G06V 10/764* (2022.01)

(58) Field of Classification Search
CPC ........ G06V 10/82; G06V 10/764; G06F 8/41; G06F 8/4441; G06F 8/4434; G06K 9/6268; G06N 3/0454; G06N 3/08
(Continued)

(56) References Cited

U.S. PATENT DOCUMENTS

2016/0350645 A1* 12/2016 Brothers .................. G06N 3/04
2018/0096226 A1*  4/2018 Aliabadi .............. G06K 9/6251
(Continued)

FOREIGN PATENT DOCUMENTS

CN          110263928 A          9/2019

*Primary Examiner* — Juan A Torres

(57) ABSTRACT

An image recognition neural network processing method includes: a compiler segments an image recognition neural network to obtain tiles of at least one network layer group; classifies the tiles of each network layer group; and for each network layer group, generates an assembly code and tile information of the network layer group according to a tile result and a classification result of the network layer group. The same type of tiles correspond to the same assembly function, each assembly code includes a code segment of the assembly function corresponding to each type of tiles, the tile information includes block information of each tile in the network layer group, the tile information used to instruct a neural network processor to, according to the block information therein, invoke a corresponding code segment to process image data of a corresponding tile when a target image is identified by the image recognition neural network.

8 Claims, 7 Drawing Sheets

(58) Field of Classification Search
USPC .......................................................... 382/156
See application file for complete search history.

(56) References Cited

U.S. PATENT DOCUMENTS

2019/0373264 A1* 12/2019 Chong ................... H04N 19/13
2021/0097347 A1*  4/2021 Kwon ................... G06N 3/0454
2021/0271847 A1*  9/2021 Courtiol ............... G06K 9/6262

* cited by examiner

|  107 | 106 | 106 | 106 | |
|---|---|---|---|---|
| Tile_TL | Tile_T | Tile_T | Tile_TR | 30 |
| Tile_L | Tile_M | Tile_M | Tile_R | 30 |
| Tile_L | Tile_M | Tile_M | Tile_R | 30 |
| Tile_L | Tile_M | Tile_M | Tile_R | 30 |
| Tile_L | Tile_M | Tile_M | Tile_R | 30 |
| Tile_BL | Tile_B | Tile_B | Tile_BR | 29 |

| MAIN | | |
|---|---|---|
| COMMON | | |
| TL_DIFF | T_DIFF | TR_DIFF |
| L_DIFF | M_DIFF | R_DIFF |
| BL_DIFF | B_DIFF | BR_DIFF |

FIG. 5

IMAGE RECOGNITION NEURAL NETWORK PROCESSING METHOD, DEVICE AND SYSTEM

CROSS REFERENCE TO RELATED APPLICATIONS

This application is a national phase entry under 35 U.S.C § 371 of International Application No. PCT/CN2020/124089, filed on Oct. 27, 2020, which claims priority to Chinese Patent Application No. 201911425797.9, filed on Dec. 31, 2019, the entire contents of all of which are incorporated herein by reference.

BACKGROUND

1. Technical Field

The present disclosure generally relates to the technical field of neural networks, and especially relates to an image recognition neural network processing method and a device, and a system.

2. Description of Related Art

An artificial neural network (ANN), generally shortened to a neural network, is a mathematical model established by abstracting a human brain neuron network from an information processing perspective. The artificial neural network is formed by connecting a large number of nodes (or called neurons) mutually, and configured to model complex relationships among data by adjusting connection relationships among the nodes, so as to solve a lot of practical problems that are difficult to be solved by modern computers.

Deep learning (DL) is developed from the artificial neural network in machine learning, and is a neural network with a certain structure, a certain training method, and a plurality of hidden layers therein. Deep learning can better implement various tasks by establishing a more complex neural network, and can obtain good application effects in the fields of computer vision, natural language processing, and data mining. At present, an image recognition neural network is configured to perform face recognition and object recognition, and is widely used in various fields.

However, because the image recognition neural network is so complex, an amount of software codes configured to process the image recognition neural network in various image recognition neural network processing systems is very large, which not only occupies a lot of space, but also is not conducive to improve efficiency of software development, thereby resulting in high system costs.

SUMMARY

The technical problems to be solved: in view of the shortcomings of the related art, the present disclosure provides an image recognition neural network processing method and a device, and a system which can reduce system costs.

In order to implement the technical solution of the present disclosure, in a first aspect, an image recognition neural network processing method according to an embodiment of the present disclosure includes:

segmenting an image recognition neural network, to obtain tiles of at least one network layer group, each network layer group including at least one network layer;

classifying the tiles of each network layer group, wherein a size and padding of the same type of tiles are the same, and sizes and/or padding of different types of tiles are different; and for each network layer group, generating assembly codes and tile information of the network layer group, according to a tile result and a classification result of the network layer group; the same type of tiles corresponding to the same assembly functions, the assembly code including code segments of the assembly functions corresponding to various tiles, the tile information including block information of each tile in the network layer group, the tile information configured to indicate that the neural network processor invokes a corresponding code segment to process image data of a corresponding tile, according to the block information of the tile information, when a target image is recognized by the image recognition neural network, and the image data of the tile generated based on the target image.

In a second aspect, an image recognition neural network processing device according to an embodiment of the present disclosure includes:

a segmentation module configured to segment an image recognition neural network, to obtain tiles of at least one network layer group, each network layer group including at least one network layer;

a classification module configured to classify the tiles of each network layer group, wherein a size and padding of the same type of tiles are the same, and sizes and/or padding of different types of tiles are different; and a generating module configured to: for each network layer group, generate assembly codes and tile information of the network layer group, according to a tile result and a classification result of the network layer group; the same type of tiles corresponding to the same assembly functions, the assembly code including code segments of the assembly functions corresponding to various tiles, the tile information including block information of each tile in the network layer group, the tile information configured to indicate that the neural network processor invokes a corresponding code segment to process image data of a corresponding tile, according to the block information of the tile information, when a target image is recognized by the image recognition neural network, and the image data of the tile generated based on the target image.

In a third aspect, a compiler according to an embodiment of the present disclosure includes a storing unit configured to store computer programs, and a processing unit configured to invoke the computer programs to perform the method of the first aspect or any embodiment of the first aspect.

In a fourth aspect, a computer readable storage medium according to an embodiment of the present disclosure is configured to store computer programs performed by a processor to implement the method of the first aspect or any embodiment of the first aspect.

In a fifth aspect, an image recognition neural network processing system according to an embodiment of the present disclosure, includes: a compiler, a central processing unit and a neural network processor;

the compiler configured to generate assembly codes and tile information of each network layer group of an image recognition neural network, according to the method of the first aspect or any embodiment of the first aspect;

the central processing unit configured to distribute the tile information of the network layer group to the neural network processor, when a target image is recognized by the image recognition neural network; and the neural network processor configured to invoke a corresponding code segment to process image data of a corresponding tile, according to block information of the tile information, the image data of the tile generated based on the target image.

According to the image recognition neural network processing method, the device and the system provided by the embodiment of the present disclosure, after receiving the image recognition neural network by the compiler, firstly segmenting the image recognition neural network, to obtain the tiles of at least one network layer group; then classifying the tiles of each network layer group; for each network layer group, generating the assembly codes and the tile information of the network layer group, according to the tile result and the classification result of the network layer group; the same type of tiles corresponding to the same assembly functions, the assembly code including the code segments of the assembly functions corresponding to various tiles, the tile information including the block information of each tile in the network layer group, the tile information configured to indicate that the neural network processor invokes the corresponding code segment to process image data of the corresponding tile, according to the block information of the tile information, when a target image is recognized by the image recognition neural network, and the image data of the tile generated based on the target image. In the technical solution, the image recognition neural network is segmented, so that the neural network processor can process the image recognition neural network by taking the tile as an unit; by classifying the tiles and then generating the assembly codes based on the classification result, the neural network processor can process the image data of the tiles by using the same code segment for the same type of tiles, so that the assembly codes can be reused, the software code amount of the image recognition neural network can be compressed. In this way, the occupied storage space can be reduced after the software code amount is reduced, a development and maintenance efficiency can be improved, and development and system costs can be effectively reduced.

BRIEF DESCRIPTION OF THE DRAWINGS

FIG. 5 is a block diagram of assembly codes in accordance with an embodiment of the present disclosure.

DETAILED DESCRIPTION

Aiming at the technical problem that high system costs are occurred in the current image recognition neural network processing system, due to the large amount of software codes, an image recognition neural network processing method, a device and a system are provided in an embodiment of the present disclosure. After receiving the image recognition neural network by a compiler, firstly segmenting an image recognition neural network, to obtain tiles of at least one network layer group; then classifying the tiles of each network layer group; for each network layer group, generating assembly codes and tile information of the network layer group, according to a tile result and a classification result of the network layer group; the same type of tiles corresponding to the same assembly functions, the assembly codes including code segments of the assembly functions corresponding to various tiles, the tile information including block information of each tile in the network layer group, the tile information configured to indicate that a neural network processor invokes a corresponding code segment to process image data of a corresponding tile, according to the block information of the tile information, when a target image is recognized by the image recognition neural network. According to the technical solution of the present disclosure, the assembly codes can be reused, to compress the software code amount and further effectively reduce the system costs.

In an embodiment of the present disclosure, the image recognition neural network can also be a natural language recognition neural network or a neural network in other application scenarios.

The technical solution of the present disclosure will be described in detail below with specific examples, the following several specific embodiments can be combined with each other, and details of the same or similar concepts or processes can't be repeated in some embodiments.

Figure 1:
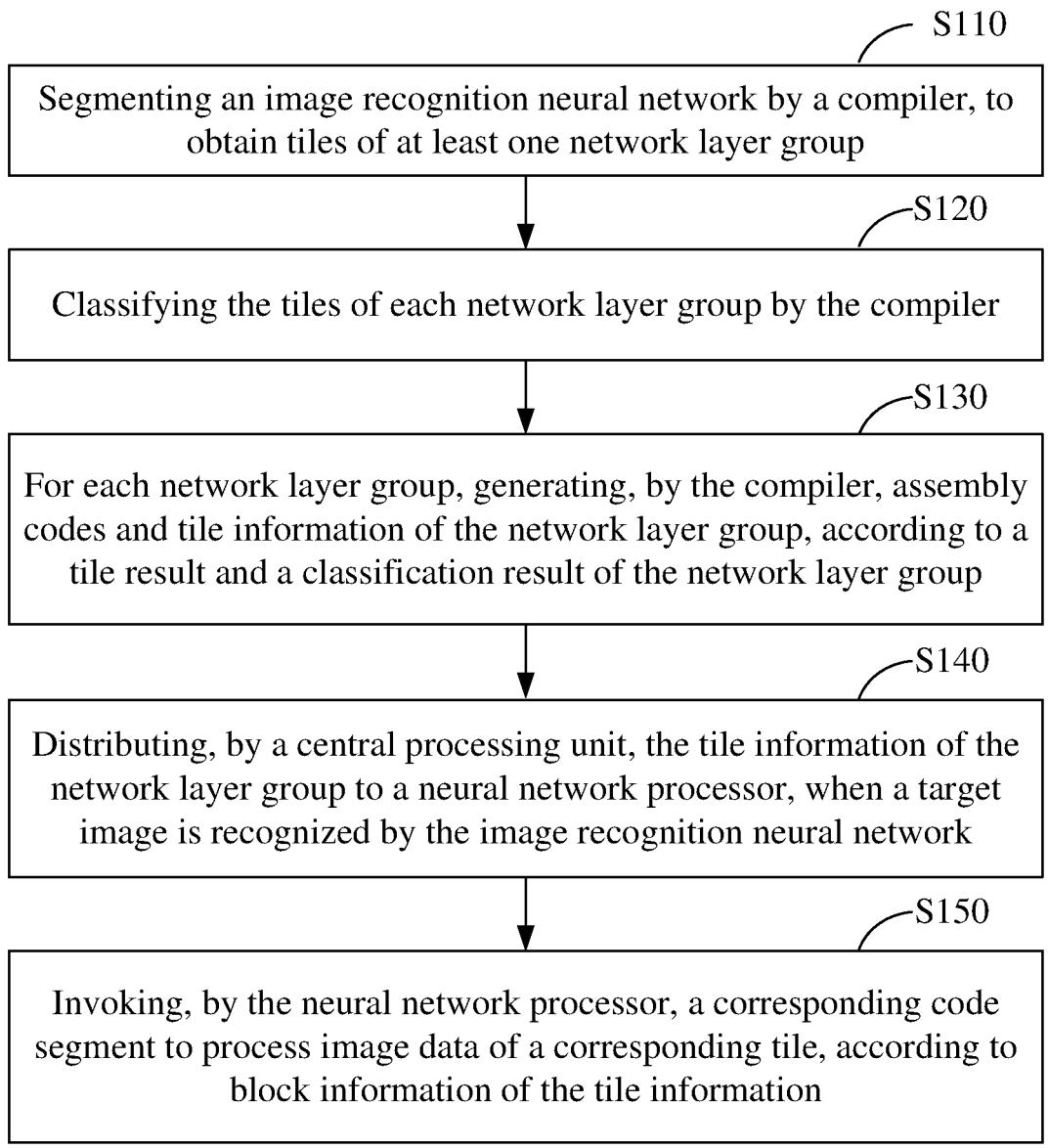
FIG. 1 is a flowchart of an image recognition neural network processing method in accordance with an embodiment of the present disclosure.

FIG. 1 is a flowchart of the image recognition neural network processing method in accordance with an embodiment of the present disclosure. Referring to FIG. 1, the method can include the following steps:

step S110, segmenting an image recognition neural network by a compiler, to obtain tiles of at least one network layer group.

In an embodiment of the present disclosure, after the compiler receives the image recognition neural network that has output by a front end thereof, the image recognition neural network can be segmented from three levels by the compiler.

Figure 2:
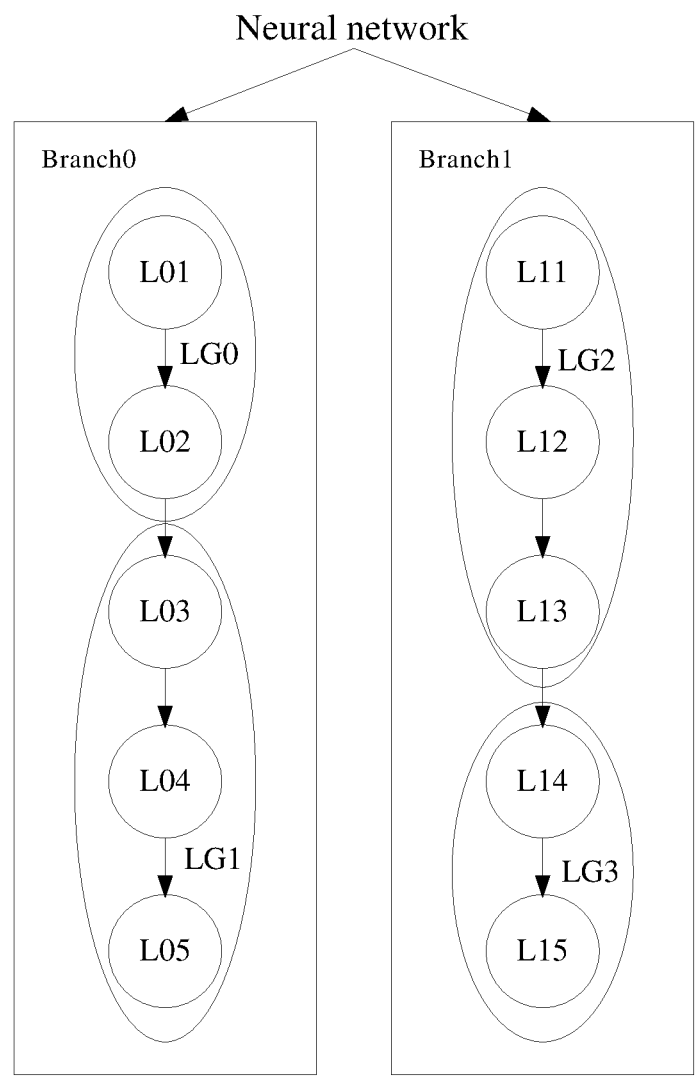
FIG. 2 is a block diagram of segmenting a neural network in accordance with an embodiment of the present disclosure.

Specifically, the image recognition neural network (hereinafter referred as the neural network) includes a plurality of branches. During segmenting the image recognition neural network, the plurality of branches can be obtained by taking merged or separated nodes as splitting points. Each branch is a linear data stream processing relationship without data merging and data bifurcation in the middle thereof. Referring to FIG. 2, a diagram of neural network segmentation according to the embodiment of the present disclosure is shown, and the neural network is segmented into two branches: Branch0 and Branch1.

For each branch, when the branch includes a large number of network layers, all layers in the branch can be segmented into a plurality of network layer groups (LG), and each LG includes at least one layer. As shown in FIG. 2, the Branch0 is segmented into two LGs: LG0 and LG1, wherein the LG0 includes two layers: L01 and L02, and the LG1 includes three layers: LG03, LG04 and LG05. Similarly, the Branch1 is segmented into two LGs: LG2 and LG3, wherein the LG2 includes three layers: L11, L12 and L13, and the LG3 includes two layers: LG14 and LG15. Of course, the numbers of branches, LGs and layers are only examples, which are not intended to restrict the present disclosure.

Figures 3, 4:
FIG. 3 is a block diagram of titles in accordance with an embodiment of the present disclosure.
FIG. 4 is a block diagram of tile information in accordance with an embodiment of the present disclosure.

For each LG, when a feature map in the LG is large, the LG can be segmented into a plurality of tiles. Referring to FIG. 3, a block diagram of tiles according to an embodiment of the disclosure is shown, and an LG is segmented into 4×6 tiles. When the LG includes the plurality of layers, an input of a next layer in the LG is an output of a previous layer in the LG, the number of tiles above is for an overall segmentation of the LG, that is, the tiles corresponding to the plurality of layers are considered as one tile.

Specifically, for each LG, the number of tiles and a segmentation direction can be determined according to hardware characteristics of the neural network processor and model characteristics of the LG, which is subject to improving processing performances of the neural network processor. The number of the tiles can be 1, that is, if the feature map in the LG is small or the performance of the neural network processor is affected by the segmentation of the LG, the LG does not need to be segmented, and the tiles at this moment are the whole LG.

The LG can be vertically and/or horizontally segmented, which can be determined according to a size of the feature map and a size of an image that can be processed by the neural network processor. In addition, during the segmentation, if the LG can't be evenly segmented, it needs to ensure that the tiles with different sizes from other tiles in each network layer group include at most one row and one column, and the tiles with different sizes from other tiles are located at the edge of the LG, so that the tiles with the same size can be obtained as many as possible. In this way, types of the tiles can be minimized in subsequent classification, so as to improve a compression effect for processing the image recognition neural network.

Referring to FIG. 3, the LG is vertically segmented into 4 columns, and horizontally segmented into 6 rows, a width of three columns of tiles on the right is 106, a width of a first column of tiles on the left is 107, a height of a first five rows of tiles is 30, and a height of the last row of tiles is 29. A size of the first column and the last row of tiles on the left are different from other tiles. Of course, the above description is only an example, and the column with the width of 107 can be arranged on the far right, and the row with the height of 29 can be arranged on the first row, that is, the rows and the columns with different sizes from the other tiles can be arranged on the edge of the LG.

In order to improve the processing efficiency of the neural network processor, in the embodiment, the branch is segmented into a plurality of LGs before the LG is segmented into the tiles, so that the neural network processor can continuously process data of the plurality of layers and then interact with an on-chip storage unit. It should be noted that in the embodiment, the branch does not need to be segmented into a plurality of LGs, that is, each layer of the branch is segmented into tiles during segmentation. Or, it can be understood that each LG can include only one layer, and a specific implementation can be selected according to requirements, which is not particularly limited in the present disclosure.

In an embodiment of the present disclosure, the neural network can be a convolutional neural network (CNN) or a recursive neural network (RNN), etc, which is not particularly limited in of the present disclosure.

Step S120, classifying the tiles of each network layer group by the compiler.

Specifically, after completing the above segmentation, for each LG, the tiles in the LG can be classified according to the size (the width and the height) and padding of the tiles, wherein the tiles with the same size and padding can be classified into the same type, the tiles with different sizes or padding can be classified into different types, that is, the same type of tiles have the same size and padding, and the tiles with different types have different sizes and/or padding.

According to the above segmentation rule and the classification rule, the tiles in an LG can be segmented into 9 types of tiles at most, which are: Top Right (TR), Top (T), Top Left (TL), Right (R), Middle (M), Left (L), Bottom Right (BR), Bottom (B), and Bottom Left (BL). For example, there are nine types of tiles shown in FIG. 3, wherein Tile_T represents a tile with a type of TL, Tile_T represents a tile of a type of T, and other tiles (Tile_TR, Tile_R, Tile_M, Tile_L, Tile_BR, Tile_B, and Tile_BL) represent similar meanings and are not described here. For easily understanding, nine types of tiles are shown in FIG. 3. During specific implementation, the types of the tiles included in the LG are determined according to the number of the tiles and the segmentation direction, and the types of the tiles include at least one type (that is, the number of the tiles in the LG is one), and the number of the tiles is not more than nine.

Step S130, for each network layer group, generating, by the compiler, assembly codes and tile information of the network layer group, according to a tile result and a classification result of the network layer group.

Specifically, there can be a plurality of tiles with the same type, such as a tile Tile_M shown in FIG. 3. When processing the same type of tiles, only a storage address of the tile is different from that of the tile after being processed, that is, an address of input data is different from that of output data. During processing the tile, the same type of tiles can be processed by skipping to the same assembly function, that is, the same type of tiles correspond to the same assembly functions. Therefore, in the embodiment of the present disclosure, for each LG, the assembly code can be generated according to the tile result and the classification result, and the code segments of the assembly functions corresponding to all the tiles in the LG are included in the assembly codes. When processing the tiles, the same code segment can be reused for processing the same type of tiles, so that the software code required for processing the neural network can be greatly compressed, the software development efficiency can be effectively improved, the system storage space can be saved, and the system cost can be effectively reduced.

In order to enable the neural network processor to correctly invoke the assembly code when processing the tile, in the embodiment, when generating the assembly code, the compiler can generate the tile information of the LG according to the tile result, the tile information including the block information of each tile in the LG, and the block information can enable the neural network processor to invoke the corresponding code segment to process the corresponding tile, according to the block information. The block information of the tile can be number information of the tile or other information that can identify the tile, and the number information can be one or two digit number information.

Referring to FIG. 4, a block diagram of the tile information in accordance with an embodiment of the present disclosure is shown. As shown in FIG. 4, the tile information (LG INFO) of an LG can include an assembly function entry address LG_PC, and the tile information of each tile can specifically be the number information of the tile: TILEN_HINDEX and TILEN_VINDEX, which respectively represents a row number and a column number of an N-th tile. The tile information of the LG can further include the number of tiles included in the LG: LG_TILE_NUM, and flag information indicates whether the LG is the last LG of the branch to which the LG belongs: LG_BBG_LAST.

It is considered that the differences of different types of tiles in the LG are small, in the embodiment, when generating the assembly code of the LG, the assembly functions corresponding to all types of tiles can be uniformly programmed, and the assembly codes can be divided into three parts: a main code segment (MAIN), a common code segment (COMMON) and a plurality of difference code segments (DIFF). Each type of tiles reuse the main code segment and the common code segment, different types of tiles invoke different difference code segments, that is, the code segment of each assembly function in the assembly code is composed of the main code segment, the common code segment and a corresponding difference code segment. The main code segment is configured to invoke the common code segment and the corresponding difference code segment, according to the block information that has input. The software code required for processing the neural network can be further compressed through the above technical means, so as to further reduce the system cost. Of course, when it does not perform tile segmentation on the LG and there is only one corresponding assembly function, the assembly code can't be segmented into three parts, or the difference code segment can be considered as empty.

Referring to FIG. 5, a block diagram of assembly codes in accordance with an embodiment of the present disclosure is shown. The assembly codes of the LG include three parts: the MAIN, the COMMON and the DIFF, nine types of tiles shown in FIG. 5 are taken as examples, so that nine corresponding assembly functions and nine corresponding DIFFs are occurred. TL_DIFF represents the DIFF part of the assembly function corresponding to the tile with a type of TL, T_DIFF represents the DIFF part of the assembly function corresponding to the tile with a type of T, and other DIFFs (TR_DIFF, L_DIFF, M_DIFF, R_DIFF, BL_DIFF, B DIFF and BR DIFF) represent similar code meanings and will not be repeated here.

After generating the assembly code and the tile information of each LG, the assembly code that has generated by the compiler, and the LG INFO can be packaged separately or together, and then stored in a NAND flash memory (NAND FLASH).

Step S140, distributing, a central processing unit (CPU), the tile information of the network layer group to the neural network processor (NNP), when a target image is recognized by the image recognition neural network.

Specifically, When the target image is recognized by the image recognition neural network by the CPU, the tile information of the LG is loaded into a memory, and then a memory address of the LG INFO is taken as a task parameter to send to the NNP, so that the NNP can process each LG INFO in turn, that is, the CPU recognizes the target image by invoking the NNP.

The memory can be, for example, various types of double data rate synchronous dynamic random access memories (DDR SDRAMs).

Step S150, invoking, by the NNP, the corresponding code segment to process image data of the corresponding tile, according to the block information of the tile information.

Specifically, the NNP can obtain a corresponding LG INFO, according to an address that has received, know which tasks of the tiles need to be performed, and know which assembly function entry addresses to be invoked to perform the tasks based on the LG INFO, so that the corresponding code segment can be invoked to process the corresponding tile, according to the assembly function entry address. In a specific invocation, the NNP can transfer the tile information to be processed to the MAIN of the assembly code, and then the MAIN can invoke the COMMON and the corresponding DIFF to process the image data of the tile corresponding to the tile information, according to the tile information, wherein the image data of the tile is generated based on the target image. In the image recognition neural network, for the LG that includes a first layer, the input feature map is the target image, and the image data of the tile in the LG is image data of a corresponding tile in the target image. For other LG, the input feature map is an output feature map of a previous LG, and the image data of the tile in the LG is image data of a corresponding tile in the input feature map.

According to the image recognition neural network processing method, provided by the embodiment of the present disclosure, after receiving the image recognition neural network by the compiler, firstly segmenting the image recognition neural network, to obtain the tiles of at least one network layer group; then classifying the tiles of each network layer group; for each network layer group, generating the assembly codes and the tile information of the network layer group, according to the tile result and the classification result of the network layer group; the same type of tiles corresponding to the same assembly functions, the assembly code including the code segments of the assembly functions corresponding to various tiles, the tile information including the block information of each tile in the network layer group, the tile information configured to indicate that the neural network processor invokes the corresponding code segment to process image data of the corresponding tile, according to the block information of the tile information, when a target image is recognized by the image recognition neural network, and the image data of the tile generated based on the target image. In the technical solution, the image recognition neural network is segmented, so that the neural network processor can process the image recognition neural network by taking the tile as an unit; by classifying the tiles and then generating the assembly codes based on the classification result, the neural network processor can process the image data of the tiles by using the same code segment for the same type of tiles, so that the assembly codes can be reused, the software code amount of the image recognition neural network can be compressed. In this way, the occupied storage space can be reduced after the software code amount is reduced, a development and maintenance efficiency can be improved, and development and system costs can be effectively reduced.

Figure 6:
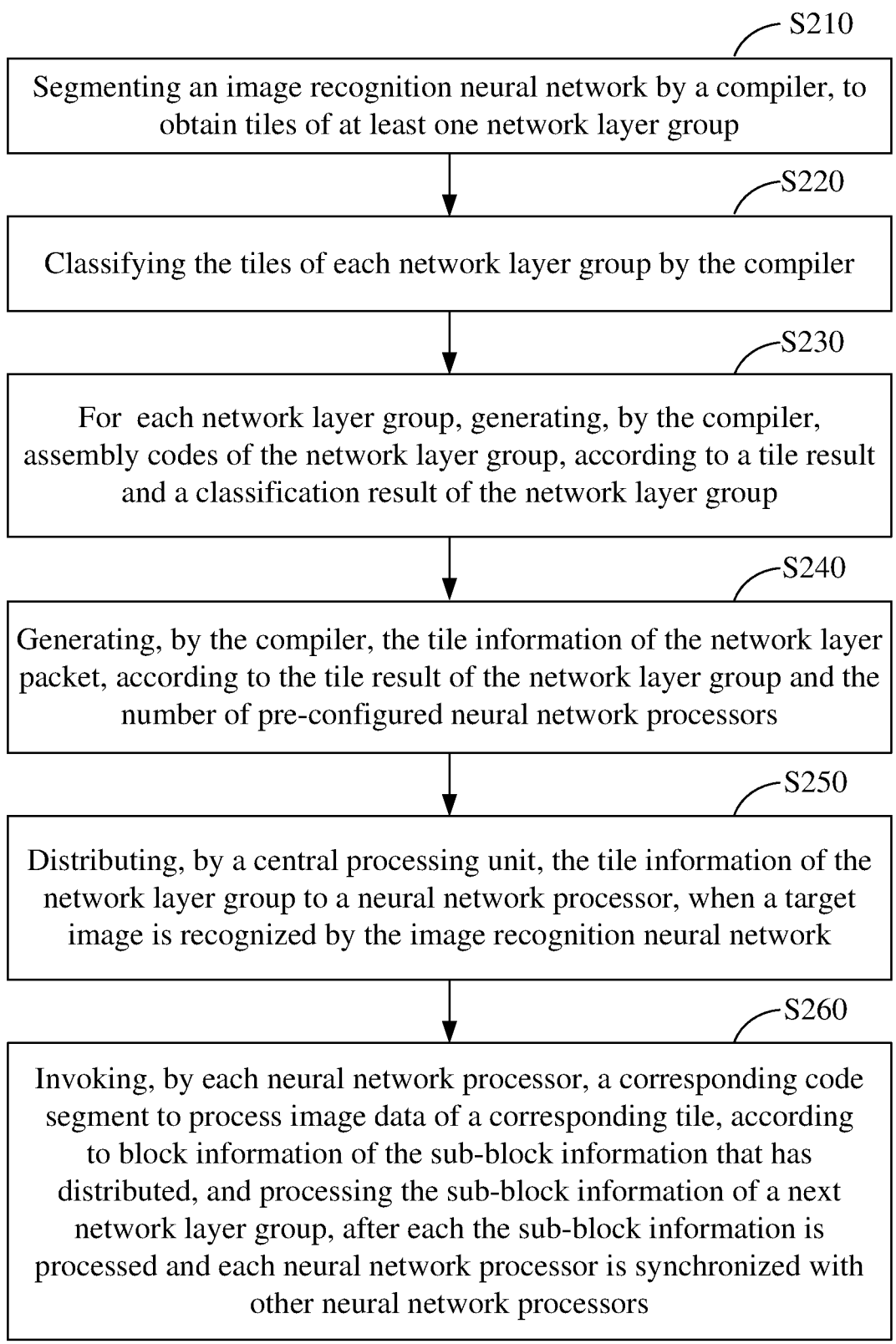
FIG. 6 is a flowchart of an image recognition neural network processing method in accordance with another embodiment of the present disclosure.

FIG. 6 is a flowchart of an image recognition neural network processing method in accordance with another embodiment of the present disclosure. This embodiment is a specific implementation method of multi-core scheduling. On the basis of the above embodiment shown in FIG. 1, the method in the embodiment of FIG. 6 can include the following steps:

step S210, segmenting an image recognition neural network by a compiler, to obtain tiles of at least one network layer group.

step S220, classifying the tiles of each network layer group by the compile.

step S230, for each network layer group, generating, by the compiler, assembly codes of the network layer group, according to a tile result and a classification result of the network layer group.

The descriptions of the above steps S210-S230 can refer to the descriptions of the steps S110-S130 corresponding to the embodiment shown in FIG. 1, which will not repeated again herein.

step S240, generating, by the compiler, the tile information of the network layer group, according to the tile result of the network layer group and the number of pre-configured neural network processors.

In an embodiment of the present disclosure, there can be a plurality of NNPs, each tile of the LG can be processed in parallel when processing the LG The compiler can pre-configure the number of neural network processors (representing the number of NNPs for processing the tiles of the LG in parallel), according to the number of NNPs, when generating the tile information, the tile information that has generated can be segmented into at least one sub-block information, according to the tile result of the LG and the number of pre-configured neural network processors. The number of sub-block information is determined according to the tile result and the number of neural network processors, and the block information of each sub-block information in the LG is combined together to form the block information of all tiles of the LG.

Specifically, when the number of tiles included in the LG is greater than or equal to the number of neural network processors that have configured, the tiles of the LG can be divided into each parallel-processed NNP for parallel processing, and at this time, the number of sub-block information can be equal to the number of neural network processors that have configured. When the number of tiles included in the LG is smaller than the number of neural network processors that have configured, the tiles of the LG can't be divided into each parallel-processed NNP for parallel processing, at this time, the number of sub-block information can be equal to the number of tiles, that is, the number of sub-block information of the LG can be one or more.

When configuring the number of neural network processors, the compiler can arbitrarily configure within a range of the actual number of NNPs based on actual requirements. For example, if there are N NNPs, the number of neural network processors configured by the compiler can be any of 1 to N.

Figure 7:
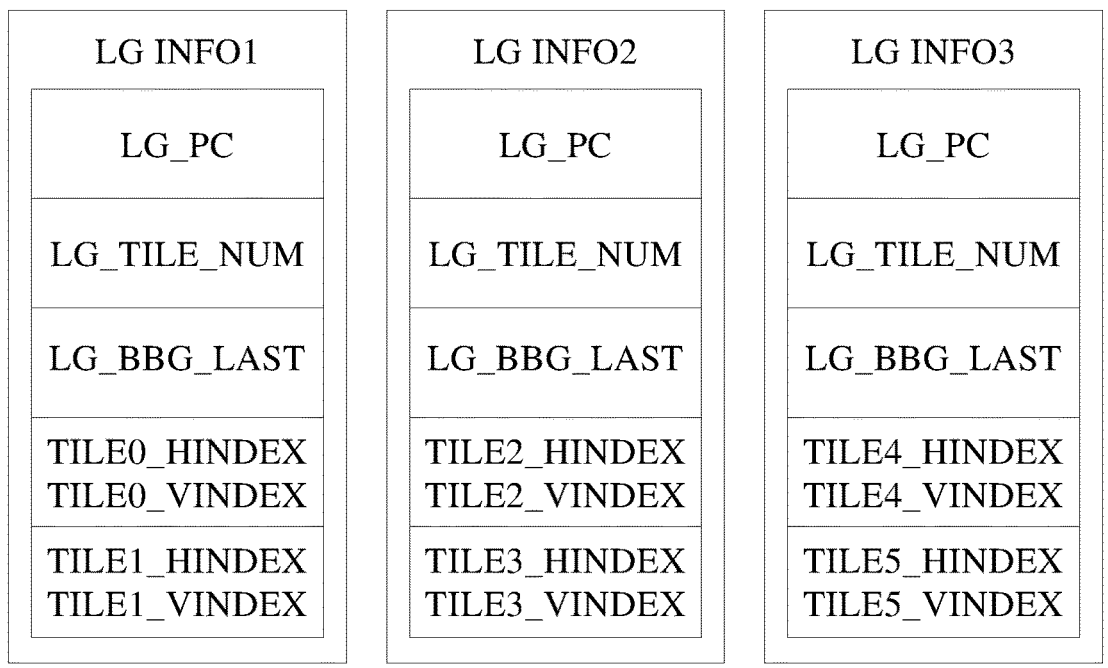
FIG. 7 is a block diagram of sub-block information in accordance with an embodiment of the present disclosure.

Referring to FIG. 7, a block diagram of the sub-block information in accordance with an embodiment of the present disclosure is shown. It is assumed that the number of tiles in FIG. 5 is 6 (tile0-tile5), and the number of neural network processors configured by the compiler is 3, the LG INFO is divided into three sub-block information: an LG INFO1, an LG INFO2 and an LG INFO3, wherein, the LG INFO1 includes index information of the tile0 and the tile1, the LG INFO2 includes index information of the tile2 and the tile3, the LG INFO3 includes index information of the tile4 and the tile5, and the LG_TILE_NUM in each sub-block information is 2.

It should be noted that in the embodiment, when generating the sub-block information, a plurality of sub-block information can be generated directly according to the tile result of the LG, or complete tile information of the LG is first generated, and then the tile information is segmented into a plurality of sub-block information, which can be selected according to requirements, rather than particularly being limited in the present disclosure.

In addition, it should be noted that there is no strict timing execution relationship between the step S230 and the step S240. The step S230 can be executed before the step S240, after the step S240, or simultaneously with the step S240. A specific execution sequence is not particularly limited in the present disclosure.

After generating the assembly code and the tile information of each LG, the assembly code that has generated by the compiler, and the LG INFO can be packaged separately or together, and then stored in the NAND flash memory (NAND FLASH).

Step S250, distributing, by the CPU, the sub-block information of the network layer group to each neural network processor, when the target image is recognized by the image recognition neural network.

Specifically, after loading the LG INFO of each LG into the memory, the CPU sends the address of the sub-block information of each LG in the memory to each NNP. For each LG, the number of NNPs that process the LG is different. As previously described, the LG can include one or a plurality of sub-block information. When the LG includes the plurality of sub-block information, the plurality of sub-block information can be equally distributed to the NNPs, while, when the LG includes only one sub-block information, the sub-block information can be distributed to one of the NNPs.

For example, the number of the NNPs is three, it is assumed that the number of the neural network processors configured by the compiler is also three. If a certain LG includes three tiles, the compiler can generate three sub-block information, and the CPU distributes one sub-block information to each NNP; if the certain LG includes two tiles, the compiler generates at most two sub-block information, and the CPU distributes the two sub-block information to the two NNPs respectively; if the LG includes one tile, the compiler generates at most one sub-block information, and the CPU distributes the sub-block information to one of the NNPs.

Step S260, invoking, by each neural network processor, the corresponding code segment to process image data of the corresponding tile, according to the block information of the sub-block information that has distributed, and processing the sub-block information of a next network layer group, after each sub-block information is processed and each neural network processor is synchronized with other neural network processors.

Specifically, each NNP can obtain the corresponding sub-block information, according to the address that has received, and then invoke the corresponding code segment to process the corresponding tile, according to the assembly function entry address in the sub-block information.

It is considered that some LGs need to be processed based on a processing result of a previous LG, each NNP needs to synchronize with other neural network processors after completely performing the sub-block information, and then process the sub-block information of the next LG.

In particular, the synchronization can be implemented by a counter, for example: there are Y NNPs, for each LG, each NNP increases the counter by 1 after processing the sub-block information. When a value of the counter is Y, each NNP can process the sub-block information of the next LG For a certain LG, if the sub-block information is not distributed to the NNP, the counter can be directly increased by 1.

For example, there are three NNPs that are processed in parallel. Three sub-block information of the LG shown in FIG. 7 are distributed to three NNPs (NNP1, NNP2, and NNP3), the NNP1 increases the counter by 1 after the LG INFO1 is processed, and the NNP2 increases the counter by 1 after the LG INFO2 is processed, and the NNP3 increases the counter by 1 after the LG INFO3 is processed; at this time, the counter is three and the three NNPs can process the sub-block information of the next LG.

A single-core scheduling and a multi-core scheduling are difficult to be unified in a current image recognition neural network processing system, so that high complexity of software programming is occurred. As can be seen from the above solutions, in the embodiment of the present disclosure, the same neural network can be independently completed by one NNP, or can be concurrently and quickly completed by a plurality of NNPs (the compiler can arbitrarily configure the number of neural network processors that process in parallel, according to the number of NNPs), both of them have been segmented into tiles, a difference is whether the tile information is distributed into the plurality of NNPs for processing, which can be easily completed by the compiler and an influence on other software programming is very small. That is to say, the technical solution provided in the embodiment is uniform in the single-core scheduling mechanism and the multi-core scheduling mechanism, simple and efficient, and low complexity of software programming.

The image recognition neural network processing method of the present disclosure provides the compiler configured to block the image recognition neural network, generate assembly codes based on the tile result, generate the sub-block information of network layer groups by configuring the number of neural network processors, and then distribute the sub-block information to each neural network processor for processing by the CPU, so as to unify the single-core scheduling mechanism and the multi-core scheduling mechanism, and reduce the complexity of software programming.

Based on the same inventive concept, an image recognition neural network processing device according to an embodiment of the present disclosure is provided as an implementation corresponding to the foregoing method, for conveniently reading, details in the embodiment of the foregoing method are not repeated in here one by one, but it should be clear that the device of the embodiment can correspondingly implement all contents of the foregoing method.

Figure 8:
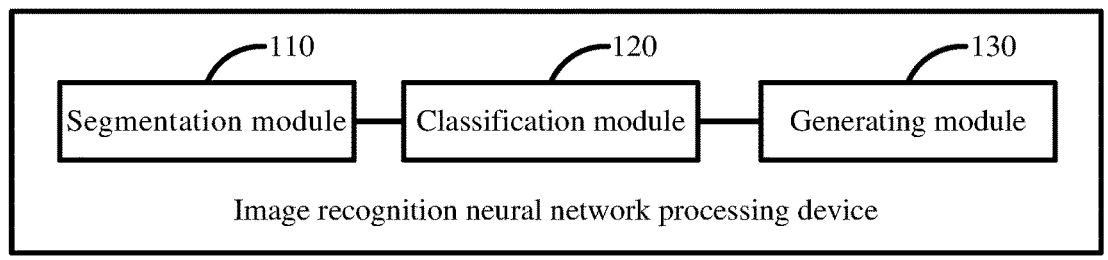
FIG. 8 is a block diagram of an image recognition neural network processing device in accordance with an embodiment of the present disclosure.

FIG. 8 is a block diagram of the image recognition neural network processing device in accordance with an embodiment of the present disclosure. The device includes:

a segmentation module 110 configured to segment an image recognition neural network, to obtain tiles of at least one network layer group, each network layer group including at least one network layer;

a classification module 120 configured to classify the tiles of each network layer group, wherein a size and padding of the same type of tiles are the same, and sizes and/or padding of different types of tiles are different; and a generating module 130 configured to: for each network layer group, generate assembly codes and tile information of the network layer group, according to a tile result and a classification result of the network layer group; the same type of tiles corresponding to the same assembly functions, the assembly codes including code segments of the assembly functions corresponding to various tiles, the tile information including block information of each tile in the network layer group, the tile information configured to indicate that the neural network processor invokes a corresponding code segment to process image data of a corresponding tile, according to the block information of the tile information, when a target image is recognized by the image recognition neural network, and the image data of the tile generated based on the target image.

As an optional implementation of the embodiment of the present disclosure, the assembly codes include: a main code segment, a common code segment and a plurality of difference code segments, the code segment of each assembly function in the assembly code including the main code segment, the common code segment and a corresponding difference code segment, and the main code segment configured to invoke the common code segment and the corresponding difference code segment, according to the tile information that has input.

As an optional implementation of the embodiment of the present disclosure, the generating module 130 specifically configured to:

generate the assembly codes of the network layer group, according to the tile result and the classification result of the network layer group; and generate the tile information of the network layer group, according to the tile result of the network layer group and the number of pre-configured neural network processors; the tile information including at least one sub-block information, wherein the number of sub-block information is determined according to the tile result and the number of neural network processors, and the block information in each sub-block information is combined together to form the block information of all tiles of the network layer group.

As an optional implementation of the embodiment of the present disclosure, each network layer group includes at most one row and one column of tiles with different sizes from other tiles, and the tiles with different sizes from other tiles are located at edge thereof.

As an optional implementation of the embodiment of the present disclosure, the tile information of each network layer group includes an assembly function entry address, and the block information of each tile in the tile information is number information of the tile.

The device of the embodiment can perform the embodiments of the above methods, and an implementation principle and a technical effect are similar to that of the above methods, which is not described herein again.

One of ordinary skill in the art can be clearly understood that: for convenient and simple description, the above functional units and modules are only split to illustrate with examples. In a practical application, different functional units and modules can be assigned to implement the above functions according to needs, that is, internal structures of the apparatus can be split into different functional units or modules to complete all or part of the functions described above. Each functional unit or each module in embodiments of the present disclosure can be integrated in a processing unit, or each unit can physically exist separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

Figure 9:
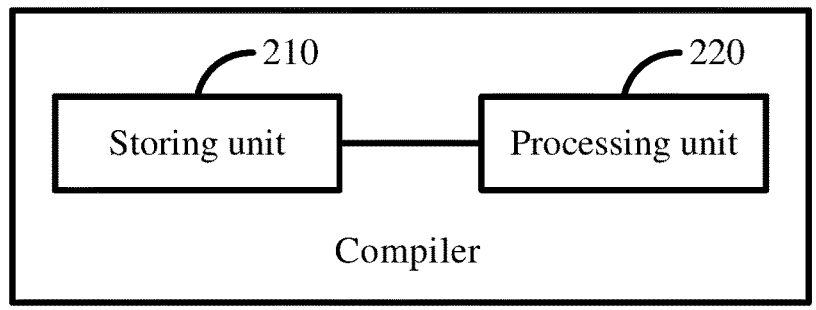
FIG. 9 is a block diagram of a compiler in accordance with an embodiment of the present disclosure.

Based on the same inventive concept, a compiler according to an embodiment of the present disclosure is provided. Referring to FIG. 9, the compiler includes: a storing unit 210 configured to store computer programs, and a processing unit 220 configured to invoke the computer programs to perform the image recognition neural network processing method above mentioned.

The compiler of the embodiment can perform the embodiments of the above methods, and an implementation principle and a technical effect are similar to that of the above methods, which is not described herein again.

A computer readable storage medium according to an embodiment of the present disclosure is configured to store computer programs performed by a processor to implement the image recognition neural network processing method above mentioned.

A computer product according to an embodiment of the present disclosure is configured to be performed by the compiler to implement the image recognition neural network processing method above mentioned.

Figure 10:
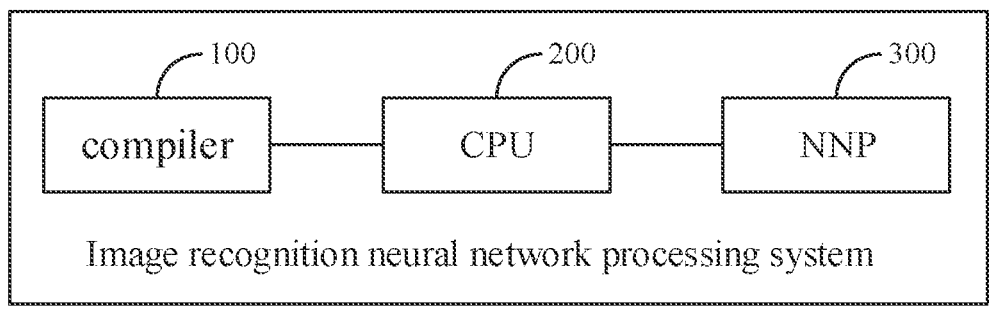
FIG. 10 is a block diagram of an image recognition neural network processing system in accordance with an embodiment of the present disclosure.

Based on the same inventive concept, an image recognition neural network processing system according to an embodiment of the present disclosure is provided. Referring to FIG. 10, the system includes: a compiler 100, a CPU 200 and an NNP 300; and the compiler 100 configured to generate assembly codes and tile information of each network layer group of an image recognition neural network, according to the image recognition neural network processing method of the first aspect or any embodiment of the first aspect;

the CPU 200 configured to distribute the tile information of the network layer group to the NNP 300; and the NNP 300 configured to: invoke a corresponding code segment to process image data of a corresponding tile, according to block information of the tile information, when a target image is recognized by the image recognition neural network, and the image data of the tile generated based on the target image.

As an optional implementation of the embodiment of the present disclosure, there are a plurality of NNPs 300, and the tile information of each network layer group includes at least one sub-block information;

the CPU 200 specifically configured to distribute each of the at least one sub-block information of each network layer group to each NNP 300;

the NNP 300 specifically configured to invoke the corresponding code segment to process the image data of the corresponding tile, according to the block information of the sub-block information that has distributed, when the target image is recognized by the image recognition neural network; and processing the sub-block information of a next network layer group, after each of the at least one sub-block information is processed, and the NNP 300 is synchronized with other NNPs 300.

The system of the embodiment can perform the embodiments of the above methods, and an implementation principle and a technical effect are similar to that of the above methods, which is not described herein again.

The integrated units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes to the devices/terminal devices, a recording medium, a computer Memory, a Read-Only Memory (ROM), a Random Access Memory (RAM), an electrical carrier signal, a telecommunication signal, and a software distribution medium such as a U disk, a mobile hard disk drive, a diskette or a CD. In some jurisdictions, in accordance with legislation and patent practice, computer readable storage medium do not include electrical carrier signals and telecommunications signals.

What is claimed is:

1. An image recognition neural network processing method comprising:
   segmenting an image recognition neural network, to obtain tiles of at least one network layer group, each network layer group comprising at least one network layer;
   classifying the tiles of each network layer group, wherein a size and padding of the same type of tiles are the same, and sizes and/or padding of different types of tiles are different; and
   for each network layer group, generating assembly codes and tile information of the network layer group, according to a tile result and a classification result of the network layer group; the same type of tiles corresponding to the same assembly functions, the assembly codes comprising code segments of the assembly functions corresponding to various tiles, the tile information comprising block information of each tile in the network layer group, the tile information configured to indicate that a neural network processor invokes a corresponding code segment to process image data of a corresponding tile, according to the block information of the tile information, when a target image is recognized by the image recognition neural network, and the image data of the tile generated based on the target image.

2. The method as claimed in claim 1, wherein the assembly code comprises a main code segment, a common code segment and a plurality of difference code segments, the code segment of each assembly function in the assembly code comprising the main code segment, the common code segment and a corresponding difference code segment, and the main code segment configured to invoke the common code segment and the corresponding difference code segment, according to the tile information that has input.

3. The method as claimed in claim 2, wherein the step of generating the assembly codes and the tile information of the network layer group, according to the tile result and the classification result of the network layer group, comprises:
   generating the assembly codes of the network layer group, according to the tile result and classification result of the network layer group;
   generating the tile information of the network layer group, according to the tile result of the network layer group and the number of pre-configured neural network processors; the tile information comprising at least one sub-block information, wherein the number of sub-block information is determined according to the tile result and the number of neural network processors, and the block information in each sub-block information is combined together to form the block information of all tiles of the network layer group.

4. The method as claimed in claim 3, wherein each network layer group comprises at most one row and one column of tiles with different sizes from other tiles, and the tiles with different sizes from other tiles are located at edge thereof.

5. The method as claimed in claim 4, wherein the tile information of each network layer group comprises an assembly function entry address, and the block information of each tile in the tile information is number information of the tile.

6. An image recognition neural network processing device applied to an electronic apparatus, the electronic apparatus comprising a processor and a memory and one or more computerized program modules stored in the memory, the one or more computerized program modules comprising instructions performed by the processor of the electronic apparatus, the modules comprising:
  a segmentation module configured to segment an image recognition neural network, to obtain tiles of at least one network layer group, each network layer group comprising at least one network layer;
  a classification module performed by the processor and configured to classify the tiles of each network layer group, wherein a size and padding of the same type of tiles are the same, and sizes and/or padding of different types of tiles are different; and
  a generating module performed by the processor and configured to: for each network layer group, generate assembly codes and tile information of the network layer group, according to a tile result and a classification result of the network layer group; the same type of tiles corresponding to the same assembly functions, the assembly codes comprising code segments of the assembly functions corresponding to various tiles, the tile information comprising block information of each tile in the network layer group, the tile information configured to indicate that a neural network processor invokes a corresponding code segment to process image data of a corresponding tile, according to the block information of the tile information, when a target image is recognized by the image recognition neural network, and the image data of the tile generated based on the target image.

7. An image recognition neural network processing system comprising:
  a compiler configured to segment an image recognition neural network, to obtain tiles of at least one network layer group, each network layer group comprising at least one network layer; classify the tiles of each network layer group, wherein a size and padding of the same type of tiles are the same, and sizes and/or padding of different types of tiles are different; and generate assembly codes and tile information of each network layer group;
  a central processing processor configured to distribute the tile information of the network layer group to a neural network processor, when a target image is recognized by the image recognition neural network; and
  the neural network processor configured to invoke a corresponding code segment to process image data of a corresponding tile, according to block information of the tile information, and the image data of the tile generated based on the target image.

8. The system as claimed in claim 7, wherein there are a plurality of neural network processors, and the tile information of each network layer group comprises at least one sub-block information;
  the central processing unit configured to distribute each of the at least one sub-block information of the network layer group to each of the plurality of neural network processors, when a target image is recognized by the image recognition neural network; and
  the neural network processor configured to invoke a corresponding code segment to process image data of a corresponding tile, according to the block information of the at least one sub-block information that has distributed, and processing the at least one sub-block information of a next network layer group, after each of the at least one sub-block information is processed, and the neural network processor is synchronized with other neural network processors.

* * * * *